US009917349B2

(12) United States Patent
McMilin et al.

(10) Patent No.: US 9,917,349 B2
(45) Date of Patent: Mar. 13, 2018

(54) WAVEGUIDES FOR DIGITAL COMMUNICATION DEVICES

(71) Applicant: Facebook, Inc., Menlo Park, CA (US)

(72) Inventors: Emily Beth McMilin, Palo Alto, CA (US); Fraidun Akhi, Fremont, CA (US); Shizhe Shen, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 526 days.

(21) Appl. No.: 14/610,938

(22) Filed: Jan. 30, 2015

(65) Prior Publication Data
US 2016/0226131 A1    Aug. 4, 2016

(51) Int. Cl.
H01Q 1/24       (2006.01)
H01Q 13/06      (2006.01)
H01Q 21/28      (2006.01)
H01Q 25/00      (2006.01)
H01P 3/12       (2006.01)
G06F 3/041      (2006.01)
H01Q 13/02      (2006.01)

(52) U.S. Cl.
CPC ............ H01Q 1/243 (2013.01); H01Q 13/06 (2013.01); H01Q 21/28 (2013.01); H01Q 25/005 (2013.01); G06F 3/0412 (2013.01); G06F 3/0416 (2013.01); G06F 2203/04103 (2013.01); H01P 3/12 (2013.01); H01Q 13/02 (2013.01)

(58) Field of Classification Search
CPC ...... H01C 1/243; H01C 25/005; H01C 13/06; G06F 3/0416; G06F 2203/04103; G06F 3/0412
See application file for complete search history.

(56) References Cited

U.S. PATENT DOCUMENTS

| 8,929,841 B2* | 1/2015 | Rofougaran | H01Q 1/2283 345/173 |
| 9,104,263 B2* | 8/2015 | Peng | G06F 3/0416 |
| 9,268,420 B2* | 2/2016 | Liu | G06F 3/041 |

(Continued)

OTHER PUBLICATIONS

Afshinmanesh, F., et al., "Transparent Metallic Fractal Electrodes for Semiconductor Devices." Nano Letters 14.9 (2014): 5068-5074.

(Continued)

Primary Examiner — Dameon E Levi
Assistant Examiner — Ab Salam Alkassim, Jr.
(74) Attorney, Agent, or Firm — Perkins Coie LLP

(57) ABSTRACT

Various of the disclosed embodiments use ITO and ITO-like materials or structures to serve as a waveguide for device communications, e.g., for mobile phone communication. Various embodiments employ an economical design, wherein one or more wireless antennas are integrated into or in conjunction with the display of a communications device as a waveguide antenna. The waveguide may use space more economically than traditional designs. In some embodiments, the waveguide can provide a wider range of viable operational frequencies. Additionally, in some embodiments, a square surface area of the waveguide optimizes the area to length ratio, which may reduce the resistance when the structure includes a lossy material. The waveguide antenna may be composed of ITO or ITO-like materials, which facilitate waveguide propagation while retaining a visually transparent character.

16 Claims, 16 Drawing Sheets

(56) References Cited

U.S. PATENT DOCUMENTS

| | | | | |
|---|---|---|---|---|
| 9,270,139 | B2* | 2/2016 | Rofougaran | H02J 1/10 |
| 9,348,440 | B2* | 5/2016 | Baek | G06F 1/1626 |
| 9,513,756 | B1* | 12/2016 | Mishra | G06F 3/044 |
| 9,666,727 | B2* | 5/2017 | Lee | H01L 29/66969 |
| 9,733,738 | B2* | 8/2017 | Gilbert | G06F 3/041 |
| 2006/0227120 | A1* | 10/2006 | Eikman | G06F 3/0425 345/175 |
| 2007/0084989 | A1* | 4/2007 | Lange | G02B 6/0011 250/221 |
| 2007/0152985 | A1* | 7/2007 | Ostergaard | G06F 3/0421 345/176 |
| 2008/0029691 | A1* | 2/2008 | Han | G06F 3/04883 250/224 |
| 2008/0284925 | A1* | 11/2008 | Han | G06F 3/0425 349/12 |
| 2009/0128499 | A1* | 5/2009 | Izadi | G06F 3/0425 345/173 |
| 2009/0167699 | A1* | 7/2009 | Rosenblatt | G06F 3/044 345/173 |
| 2010/0260460 | A1* | 10/2010 | Harrysson | H01Q 1/1271 385/119 |
| 2010/0271273 | A1* | 10/2010 | Stjernman | H01Q 1/2266 343/702 |
| 2010/0302185 | A1* | 12/2010 | Han | G06F 3/042 345/173 |
| 2010/0302196 | A1* | 12/2010 | Han | G06F 3/0425 345/173 |
| 2010/0302210 | A1* | 12/2010 | Han | G06F 3/0412 345/175 |
| 2010/0321325 | A1* | 12/2010 | Springer | G06F 3/041 345/174 |
| 2011/0298670 | A1* | 12/2011 | Jung | H01Q 1/243 343/702 |
| 2012/0086669 | A1* | 4/2012 | Kim | G06F 3/0412 345/174 |
| 2012/0094594 | A1* | 4/2012 | Rofougaran | G06F 1/1626 455/15 |
| 2012/0325522 | A1* | 12/2012 | Ogino | H01Q 1/243 174/250 |
| 2013/0196596 | A1* | 8/2013 | Parekh | G06F 1/1643 455/41.1 |
| 2014/0106684 | A1* | 4/2014 | Burns | H01Q 1/243 455/78 |
| 2014/0164918 | A1* | 6/2014 | Nicolas | G06F 3/0421 715/704 |
| 2014/0354906 | A1* | 12/2014 | Wu | G06F 3/041 349/12 |
| 2015/0301634 | A1* | 10/2015 | Gilbert | G06F 3/043 345/173 |
| 2016/0328057 | A1* | 11/2016 | Chai | G06F 3/0412 |

OTHER PUBLICATIONS http://www.cimananotech.com, [online] pp. 1-2, 2015 [Retrieved on Jan. 6, 2014].

http://www.cimananotech.com/products/touch, [online] pp. 1-2, 2015 [Retrieved on Jan. 6, 2014].

Katsounaros, A. et al., "Optically Transparent Ultra-Wide Band Antenna," Electronics Letters 45, No. 14 (2009): 722-723.

Liu, M.-H. et al., "A new coplanar waveguide fed transparent antenna at 2.4 GHz," International Journal of Science and Engineering 2.4 (2012): 7-16.

Sante FS200 Touch Films, Cima NanoTech, Technical Data Sheet FS200, Feb. 2014, 1 page.

* cited by examiner

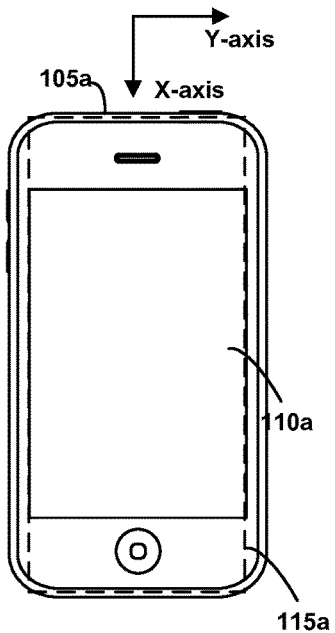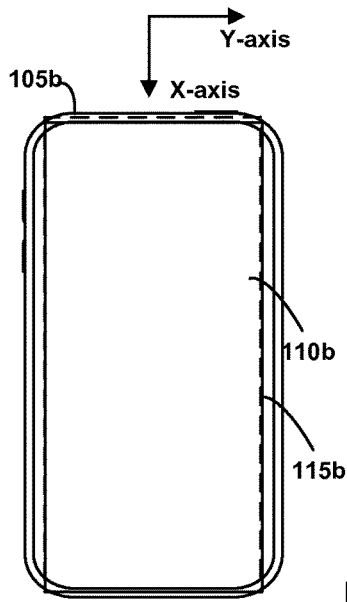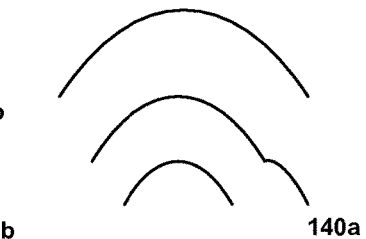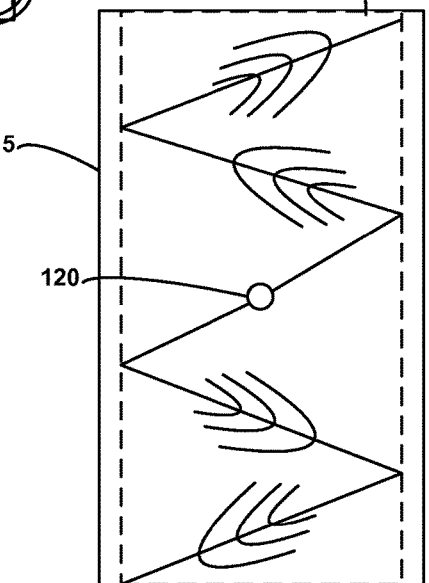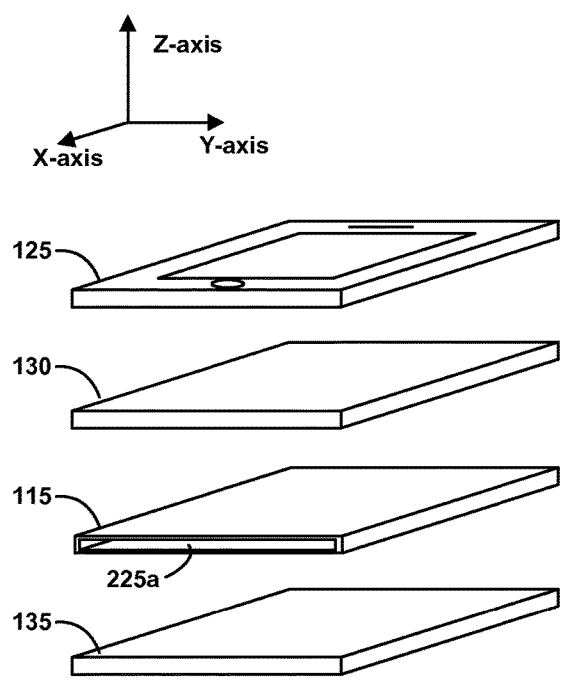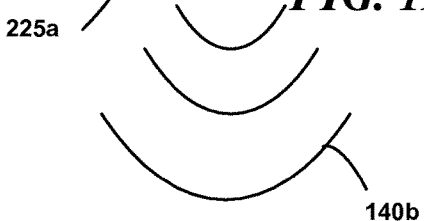
*FIG. 1A*
*FIG. 1B*
*FIG. 1C*
*FIG. 1D*

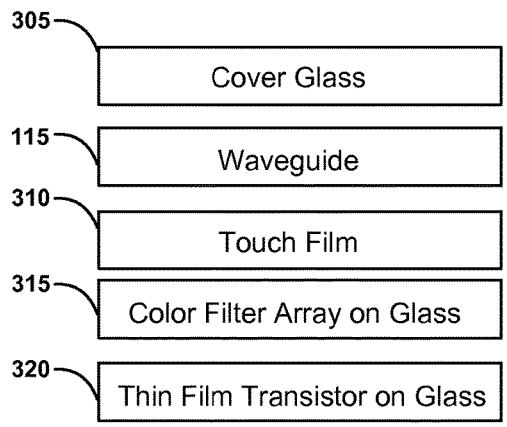
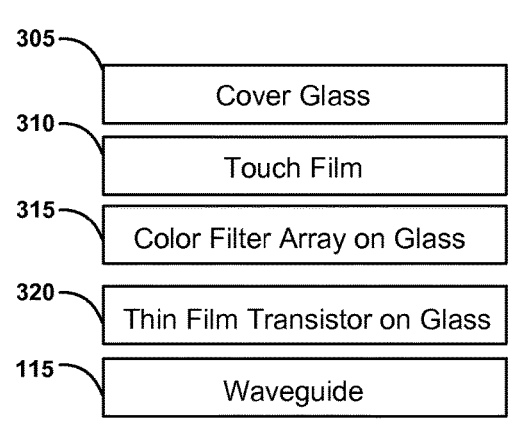
FIG. 3A
FIG. 3B
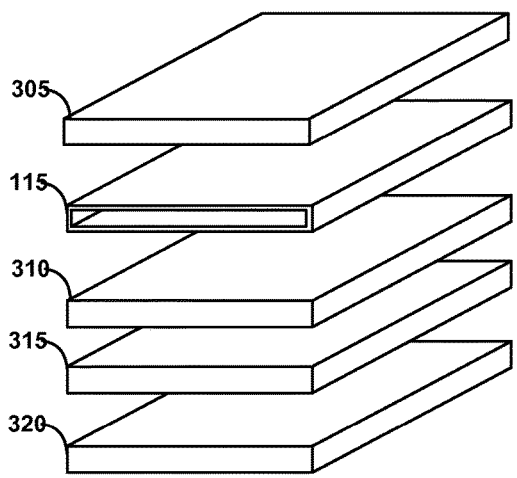
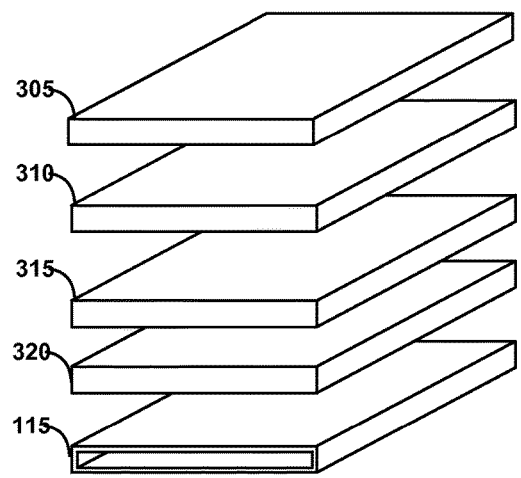
FIG. 3C
FIG. 3D

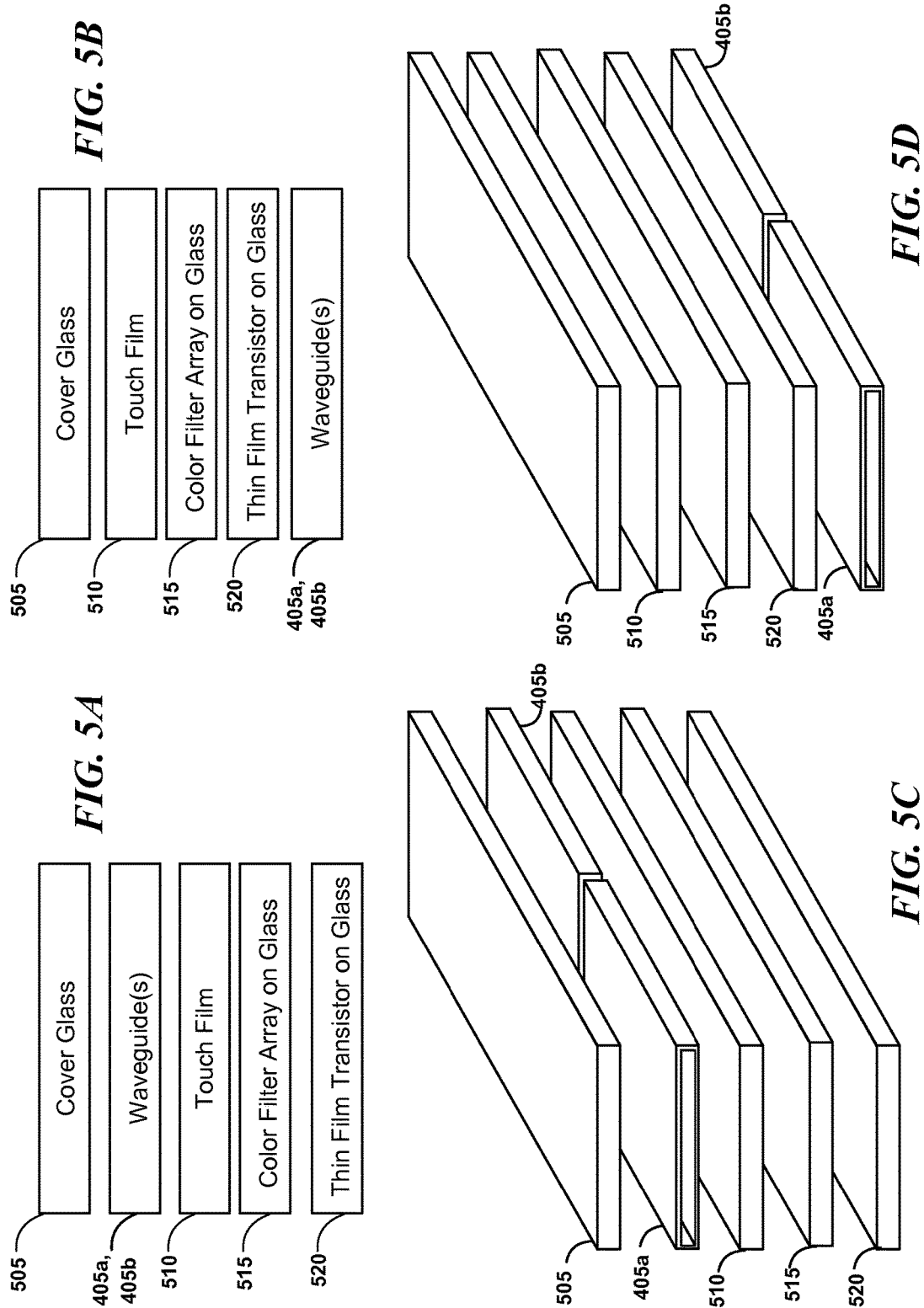

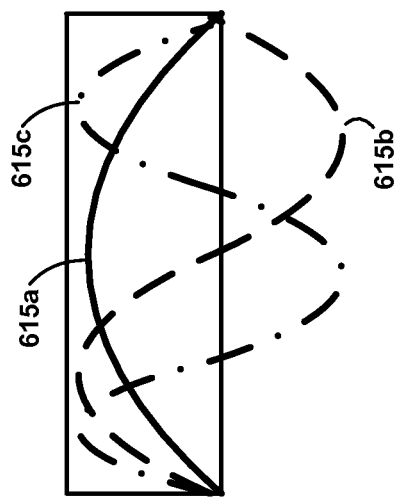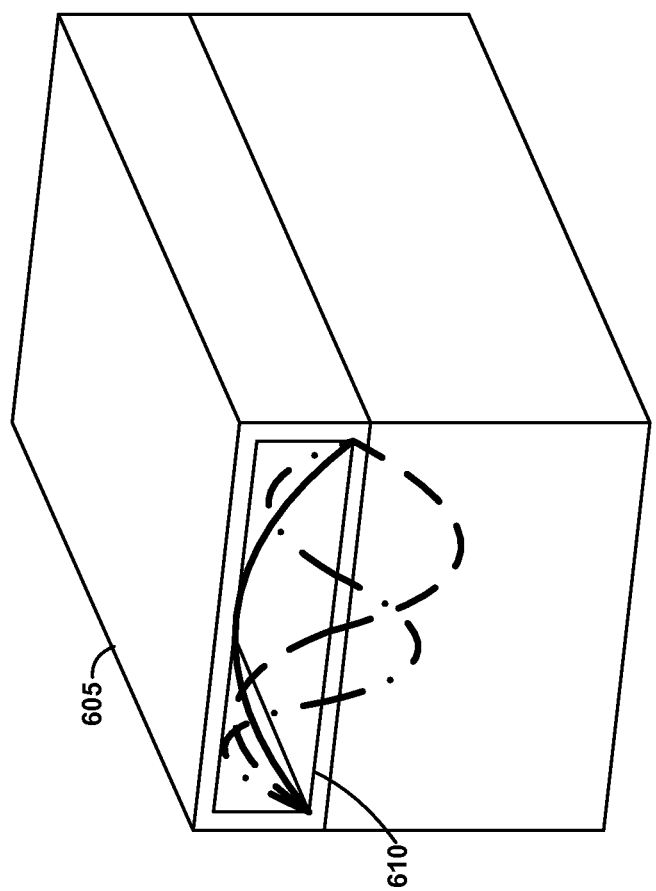
FIG. 6

WAVEGUIDES FOR DIGITAL COMMUNICATION DEVICES

TECHNICAL FIELD

The disclosed embodiments relate to waveguides for communications devices.

BACKGROUND

Many user devices (e.g., tablets, mobile phones, laptops, smart watches, etc.) require efficient layout designs and manufacturing methods. For example, a mobile phone with poorly placed components may be unbalanced, weigh more than is desirable, produce interference between onboard components, etc. These defects may adversely affect the user's experience and increase the device's operation and repair costs. Similarly, designers also seek economy during the device's manufacturing process. Designs incorporating many different materials and components will generate additional cost as each material and component must be separately acquired, tested, and integrated. Disparate component materials can also impose complications and additional steps to the manufacturing process, resulting in additional cost and slower production.

Mobile device designers have previously used Indium-Tin-Oxide (ITO) as a transparent conductor for liquid crystal displays (LCDs). ITO may include roughly 90% $IN_2O_3$ and 10% $SnO_2$ by weight, though one will recognize variations for different use cases. While ITO and similar materials have many desirable properties, ITO can be expensive relative to other materials in a communications device. Furthermore, the ITO deposition for the display may cover a substantial portion of the device's surface area. Accordingly, it would be desirable for a designer to include ITO and/or ITO-like materials/structures into the communications devices as efficiently as possible.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 1A is a frontal view of a user device incorporating a waveguide and a partial-frontal display as implemented in some embodiments; FIG. 1B is a frontal view of a user device incorporating a waveguide and full-frontal display as implemented in some embodiments; FIG. 1C is an exploded isometric view of the device of FIG. 1A; FIG. 1D is a reflection model for a waveguide as may be implemented in, e.g., the device of FIG. 1A or FIG. 1B;

FIG. 3A is a cross-sectional view of an example component material layout as may be applied in a user device of some embodiments; FIG. 3B is a cross-sectional view of another example component material layout as may be applied in a user device of some embodiments; FIG. 3C is an isometric view of the component material layout of FIG. 3A as may be implemented in some embodiments; FIG. 3D is an isometric view of the component material layout of FIG. 3B as may be implemented in some embodiments;

FIG. 5A is a cross-sectional view of an example component material layout for a dual, single-ended waveguide as may be applied in a user device of some embodiments; FIG. 5B is a cross-sectional view of another example component material layout for a dual, single-ended waveguide as may be applied in a user device of some embodiments; FIG. 5C is an isometric view of the layout of 5A as may be implemented in some embodiments; FIG. 5D is an isometric view of the layout of 5B as may be implemented in some embodiments;

FIG. 6 is an isometric view of a waveguide and various viable frequencies as may be implemented in some embodiments;

Figure 2A:
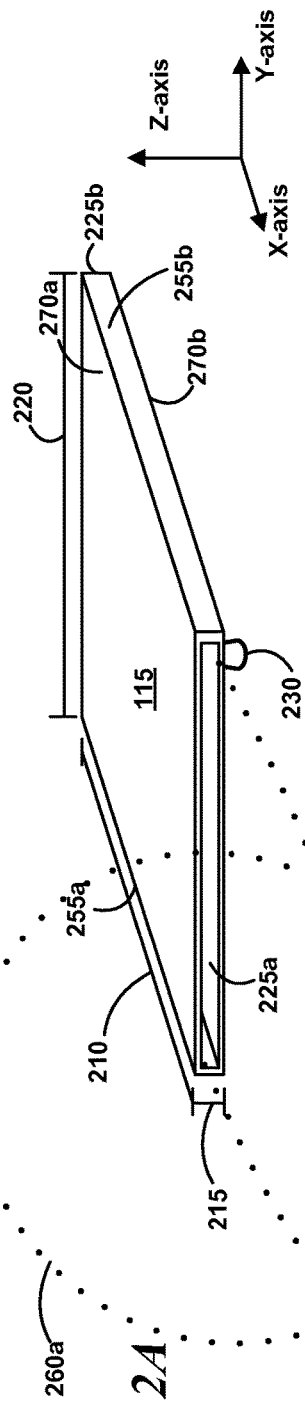
FIG. 2A is an isometric view of a dual-ended waveguide as may be implemented in some embodiments.

One will also recognize that many of the images are not to scale and that the relative dimensions of various components may be varied in embodiments. The headings provided herein are for convenience only and do not necessarily affect the scope or meaning of the claimed embodiments. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various of the disclosed embodiments use ITO and ITO-like materials/structures to serve as a waveguide for device communications, e.g., for mobile phone communication. Many existing wireless devices include a display and one or more wireless antennas. Including these elements separately consumes scarce spatial resources on the device. Furthermore, a separate antenna and display can require the introduction of different materials and components into the design process. Various embodiments instead employ a more economical design, wherein one or more of the wireless antennas are integrated into, or placed adjacent to, the display as a waveguide antenna. Not only may the waveguide use space more economically, but in some embodiments the waveguide can provide a wider range of viable operational frequencies. The waveguide antenna may be composed of ITO or ITO-like materials/structures, which facilitate waveguide propagation while retaining a visually transparent character. Though ITO will be regularly referenced herein to facilitate understanding, one will readily understand that in some embodiments may employ any of a diverse group of structures and materials having similar properties. For example, various nanowire structures, fine gold structures embedding a substrate, nanomeshes, etc. may be generally optically transparent while still providing the desired wave propagation characteristics. In some embodiments, multiple waveguides may be incorporated into the display, facilitating MIMO and other diversity applications. The waveguide's dimensions may be selected to facilitate a desired power distribution pattern for desired frequency ranges.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview

In many mobile devices (e.g., smart phones, tablets, etc.) the display constitutes a considerable portion of the device's surface area. ITO and ITO-like materials/structures (e.g., those which are electrically conductive but optically transparent) are an active area of research. Researchers increasingly reduce the resistance of these new materials. Various embodiments of the disclosed technology use these ITO-like materials and display real-estate to serve as an antenna. Some antennas require free-space (e.g. in three x, y, z spatial dimensions) in order to achieve separation of charge and radiate. For example, in some Polychlorinated Biphenyl (PCB) antennas the ground-plane beneath the antenna is removed of interfering material. Planar Inverted-F Antennas (PIFAs) may also impose sufficient separation (in the x, y, z spatial dimensions) from the chassis/ground-plane.

In some user devices, there may be a conductive surface immediately beneath the display ITO material. Consequently, there may be insufficient z-axis separation for normal PCB or PIFA antennas. Additionally, as surface resistance decreases with width, but increases with length, traditional, long thin antennas may be inefficient. Thus, various embodiments implement classes of antennas which may operate effectively with little z-axis separation and may also happen to be wide, including, e.g.: waveguide antennas; patch antennas; etc. Patch antennas may be wide and provide z-axis separation, however, they may have a very high quality factor with low fractional bandwidth, e.g.: ~3%. This may not be acceptable in some circumstances. Thus, embodiments employing waveguide antennas can instead have very large instantaneous bandwidths, e.g.: almost 200%, and may provide a more viable solution in many situations.

Some embodiments integrate waveguide antennas into user devices, e.g., into mobile phones, using the side of the phone opposite the display for use as a waveguide antenna. Operation in the Z-direction may be lossy, however, as field lines between the screen and backplane antenna cause charge to be lost. Accordingly, some embodiments place the waveguide in contact with, or in proximity to, the display.

FIG. 1A is a frontal view of a user device 105*a* incorporating a waveguide 115*a* and a partial-frontal display 110*a* as implemented in some embodiments. As depicted, the display 110*a* may occupy less than all of the length/width of the user device 105*a*. The waveguide may extend to the ends of the user device along the X-axis, or may extend to less than the full length (e.g., only the length of display 110*a*) depending upon the embodiment.

FIG. 1C is an exploded isometric view of the device of FIG. 1A. In this example, the waveguide 115 may be sandwiched between a display surface component 130 (e.g., a capacitive, touch-screen display) and control electronics 135. An aesthetic cover and/or inputs 125 may be provided. In some embodiments, both the display surface component 130 and the waveguide 115 are the same component. Similarly, the aesthetic cover and/or inputs 125 may not comprise a separate physical structure.

In some embodiments, the display and waveguide may share one or more dimensions. In FIG. 1B the display 110*b* and waveguide 115*a* may form a single, contiguous unit extending the full length of the user device 105*b* in the X-axis. Note that the devices 105*a* and 105*b* may differ from traditional designs in that regions reserved for antennas are now allocated to a portion of the waveguide.

FIG. 1D is a reflection model for a waveguide as may be implemented in, e.g., the device of FIG. 1A or FIG. 1B. An emission source 120 (e.g., an electric-field probe) may be placed within the waveguide to generate a power pattern for transmission and reception of communication signals. As illustrated, the generated electromagnetic wave may travel via reflection until exiting via each of apertures 225*a* and 225*b*.

In some embodiments, the antenna may be in free space and so the display and antenna are not contiguous. This may be particularly useful for lower frequencies in some embodiments. ITO is somewhat conductive and lossy and some embodiments employ more conductive materials. Nanomesh technologies may also allow one to efficiently switch between bandwidths (e.g., 700 Mhz-2.4 Ghz). Though some embodiments implement a waveguide as an efficient active (e.g., driven) antenna element for an ITO-like substrate, some embodiments also implement passive elements (e.g., parasitically coupled to an active antenna element via electromagnet fields) that may also be made from an ITO-like substrate/structure. For example, some embodiments implement parasitic directors and reflectors formed from the ITO to create desired far field radiation beams (dynamically in some embodiments). Some embodiments may implement parasitic scatterers to decouple closely spaced active Multi-Input-Multi-Output (MIMO) antennas.

Example Single, Dual-Ended Waveguide Structure

FIG. 2A is an isometric view of a dual-ended waveguide as may be implemented in some embodiments. The dimension 215 may significantly affect the output radiation pattern when the waveguide is relatively small. Dimension 215 may be between 1 mm-5 mm, or less, in some embodiments. The aperture's 225a dimensions may generate a broad vertical beam 260a and a narrow horizontal beam 260b (a similar pattern will be effected on the opposing end of the waveguide in those embodiments where the waveguide has two apertures).

The dimension 220 may be approximately 71 mm in some embodiments and the dimension 210 may be approximately 140 mm in some embodiments (one will recognize that the images are not necessarily to scale). These dimensions are merely exemplary. For example, 71 mm is suitable for the dimension 220 when the wavelength is approximately ~120 mm at ~700 MHz and the waveguide comprises a material with a dielectric constant of approximately 13. Other frequencies and dielectric constants can be associated with other dimensions.

In some embodiments, the dimension 220 may be constrained to half the wavelength of the lowest desired communication frequency (other dimensions may be relatively free of constraint in some embodiments). Apertures 225a and 225b may be present on opposing surfaces at the ends of the waveguide 115. Side surfaces 255a and 255b may be made of a conductive material. Top 270a and bottom 270b surfaces may be made of an ITO or ITO-like material, nanomesh, etc. The surface 270a may also serve as a portion of a display, or the waveguide may be above, or below, a display element (and may be integrated into or distinct form the display component) in various embodiments. In some embodiments, the central volume of the waveguide may be filled with a low loss dielectric.

Figure 2B:
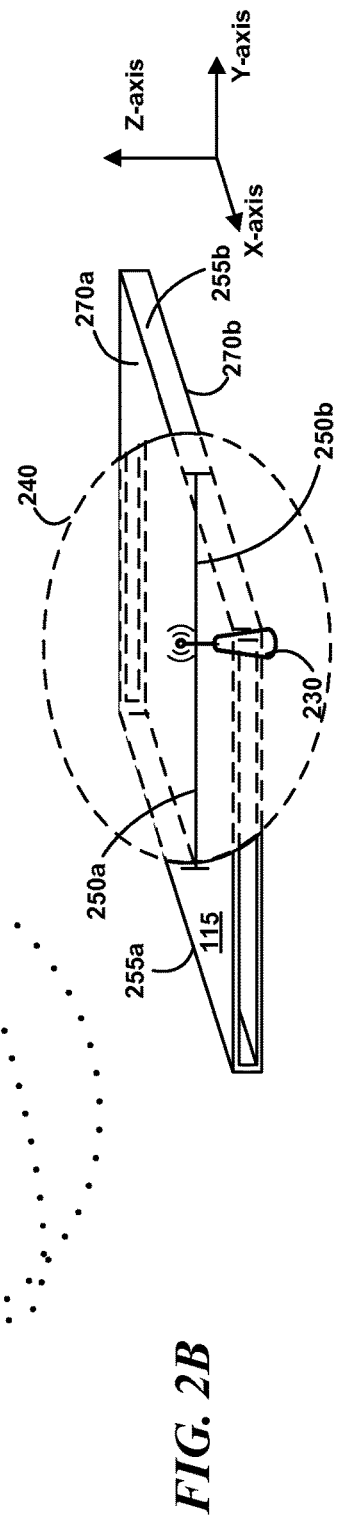
FIG. 2B is an isometric view of the dual-ended waveguide of FIG. 2A with a transparent mask.

FIG. 2B is an isometric view of the dual-ended waveguide of FIG. 2A with a transparent mask 240 facilitating a view of the inside of the waveguide 115. The transparent mask 240 reveals an emission source 230 introduced into the waveguide 115. The emission source 230 may be introduced through an edge of the waveguide as illustrated, may be integrated into a surface, or otherwise positioned to facilitate a radiation emission. In some embodiments, each of the distances 250a, 250b from the source 230 to each edge 255a, 255b may be the same (e.g., the emission source 230 may be centered along the Y-axis of the waveguide 115 between the edges 255a, 255b).

Figure 2C:
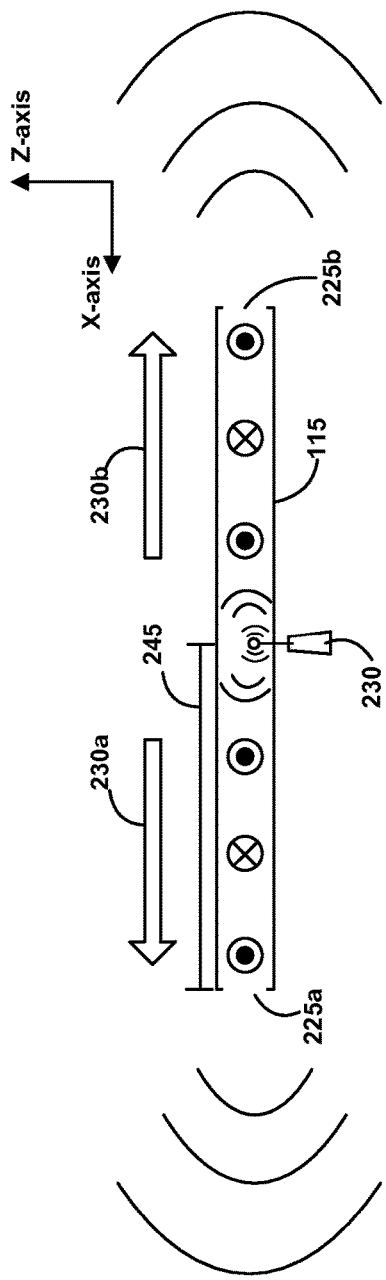
FIG. 2C is a cross-sectional view of the dual-ended waveguide of FIG. 2A.

FIG. 2C is a cross-sectional view of the dual-ended waveguide of FIG. 2A. As indicated, the electromagnetic waves may oscillate down 230a, 230b the length of the waveguide 115 until exiting apertures 255a, 255b. The emission source 230 may be placed at the center of the waveguide. For example, if the waveguide is 140 mm long in the X-axis, the distance 245 may be approximately 70 mm long. In some embodiments there is only one aperture at one end of the waveguide, rather than two as depicted here. The waveguide may not extend the full length of the communication device in some embodiments.

Example Single, Dual-Ended Waveguide Component Layout

FIG. 3A is a cross-sectional view of a component material layout for a single, dual-ended (i.e., has two opposing apertures) waveguide 115 as may be applied in a user device of some embodiments. Accordingly, FIG. 3A is one possible arrangement of components in a user device that includes a waveguide antenna. FIG. 3B is an isometric view of the component material layout of FIG. 3A as may be implemented in some embodiments. Though a waveguide 115 with two apertures is considered in this example, the same or similar layout may also be applied for a waveguide with only one aperture. The waveguide 115 may be formed/positioned beneath protective cover glass 305 and above a touch film 310. A color filter array on glass 315 and thin film transistor on glass 320 may reside beneath the touch film 310. Though depicted here on glass for this example, the components need not be upon glass in all embodiments. An alternative configuration is presented in FIG. 3B, wherein the waveguide 115 resides below the thin film transistor 320. Some embodiments contemplate two waveguides, e.g., one at the position of FIG. 3A and the other at the position of FIG. 3B. FIG. 3C is an isometric view of the component material layout of FIG. 3A as may be implemented in some embodiments. FIG. 3D is an isometric view of the component material layout of FIG. 3B as may be implemented in some embodiments.

Example Dual, Single-Ended Waveguide Structure

Figure 4A:
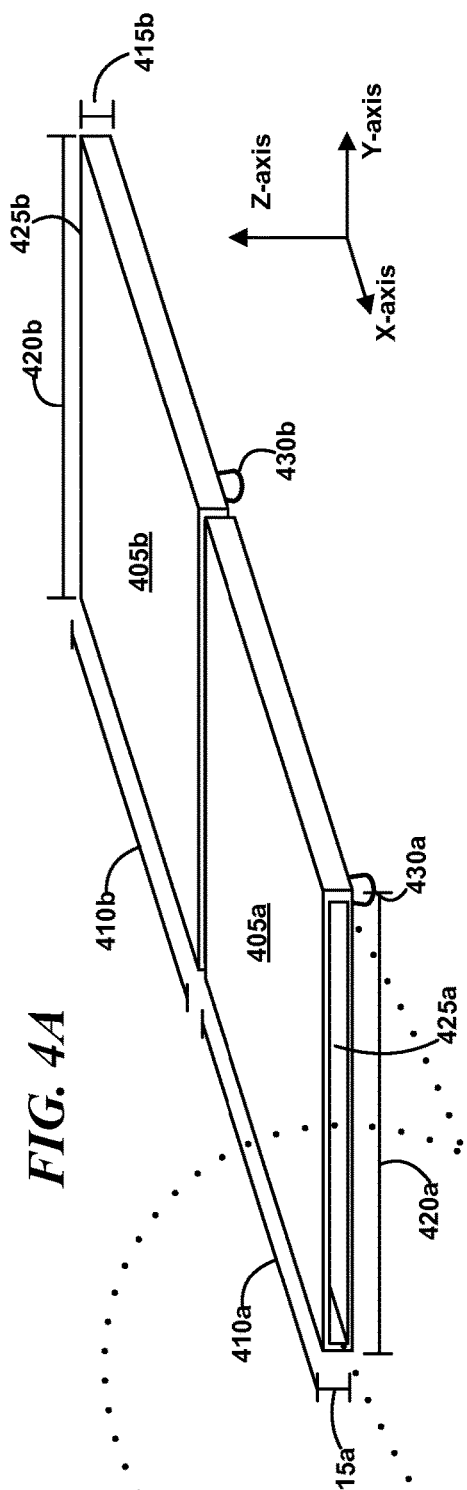
FIG. 4A is an isometric view of a waveguide pair as may be implemented in some embodiments.
Figure 4B:
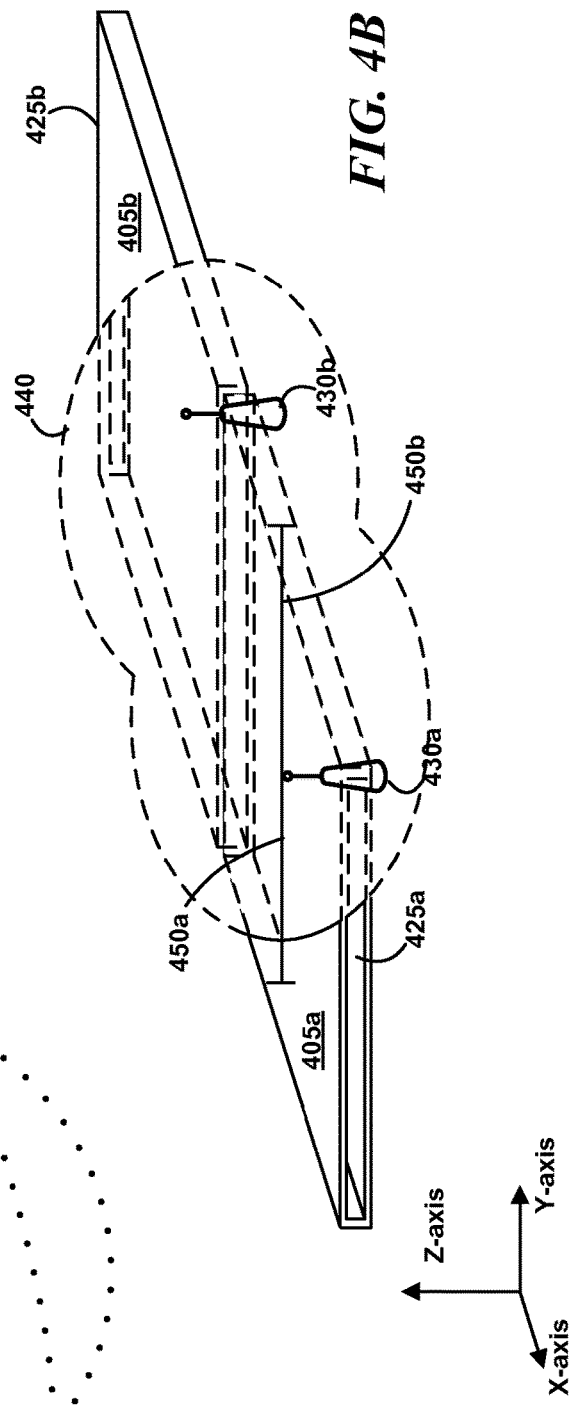
FIG. 4B is an isometric view of the waveguide pair of FIG. 4A with a transparent mask.
Figure 4C:
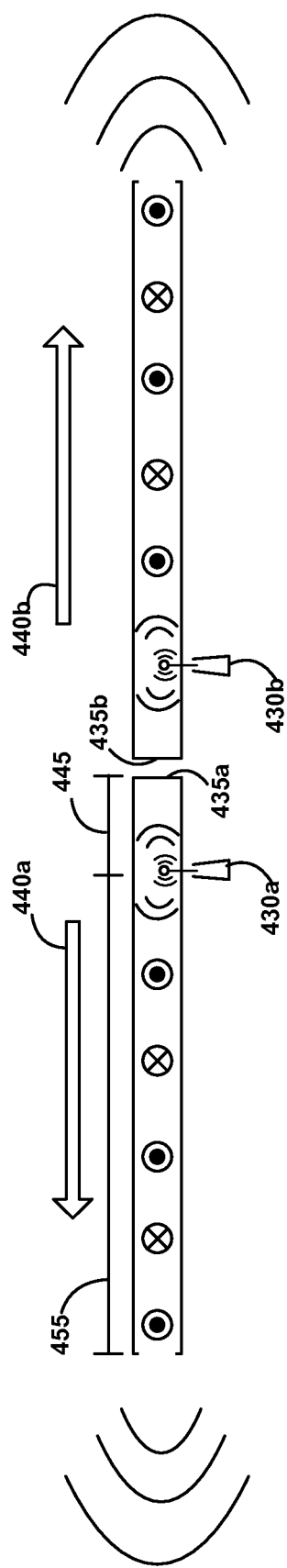
FIG. 4C is a cross-sectional view of the waveguide pair of FIG. 4A.

In some embodiments, multiple waveguides may be implemented together to serve multiple functions or to achieve a combined, synergistic effect. For example, two or more spatially de-correlated antennas may be very effective for MIMO applications. FIG. 4A is an isometric view of a waveguide pair as may be implemented in some embodiments, each member of the pair having a single aperture. FIG. 4B is an isometric view of the waveguide pair of FIG. 4A with a transparent mask 440. FIG. 4C is a cross-sectional view of the waveguide pair of FIG. 4A.

In this example, each of the waveguides 405a, 405b may be integrated into the user device. For example, the dimensions 410a and 410 may each comprise half the length of the waveguide 115, e.g., approximately 70 mm each (again, the figures are not necessarily to scale). The dimensions 420a and 420b may remain approximately 71 mm (e.g., half the wavelength of the lowest desired communication frequency). The combined dimensions 410a and 410b may be greater than the wavelength of the lowest desired frequency in some embodiments. While apertures 425a, 425b may be available at opposing ends of each waveguide, the ends 435a, 435b may be sealed (or comprise a single closed surface in some embodiments).

As illustrated, two source emitters 430a, 430b may be provided. In some embodiments the source emitters 430a, 430b may be a single component with separate interfaces into each of the waveguides. Each source emitter may be positioned at a distance 445 from the closed end of the waveguide and a distance 455 from the respective aperture. In this manner, the electromagnetic waves produced by the sources may propagate in the directions 440a, 440b to be emitted from the apertures in a desired emission pattern. In some embodiments of the single waveguide and waveguide pairs discussed above, the emission sources may be movable or configurable during operation of the waveguide(s).

Example Dual, Single-Ended Waveguides Component Layout

FIG. 5A is a cross-sectional view of an example component material layout for a pair of single-ended waveguides (e.g., waveguides 405a, 405b) as may be applied in a user device of some embodiments. The waveguides 405a, 405b may be formed beneath a protective cover glass 505 and above a touch film 510 in this example. A touch film 510 may be provided above a color filter array 515 and above a thin film transistor on glass 520. Though depicted here on glass for this example, the components need not be upon glass in all embodiments. FIG. 5B is a cross-sectional view of another example component material layout for a dual, single-ended waveguide as may be applied in a user device of some embodiments. Again, some embodiments also complete combining the configurations of FIGS. 5A and 5B such that two waveguides or two pairs of waveguides appear in the stack. FIG. 5C is an isometric view of the layout of 5A as may be implemented in some embodiments. FIG. 5D is an isometric view of the layout of 5B as may be implemented in some embodiments.

In some embodiments the material inside waveguides 405a, 405b has a dielectric constant of approximately 13 and loss tangent of approximately 0.002. These exemplary values are associated with the reference material TMM13i, which is a ceramic. As TMM13i is neither flexible nor transparent many embodiments will instead adopt other ITO-like materials.

Viable Communication Frequencies

FIG. 6 is an isometric view of a waveguide 605 and various viable frequencies as may be implemented in some embodiments. In some embodiments, the waveguide may facilitate communication at frequencies higher than the frequency corresponding to a wavelength twice the width of the aperture 610. For example, patterns 615b and 615c reflect integer multiple harmonics of pattern 615a. However, some embodiments may also facilitate communication continuously along the frequencies, e.g., from the lowest frequency whose half wavelength corresponds to the aperture width, to a highest frequency capable of being generated given the limitations of the emission source(s).

Simulation Results

Figure 7:
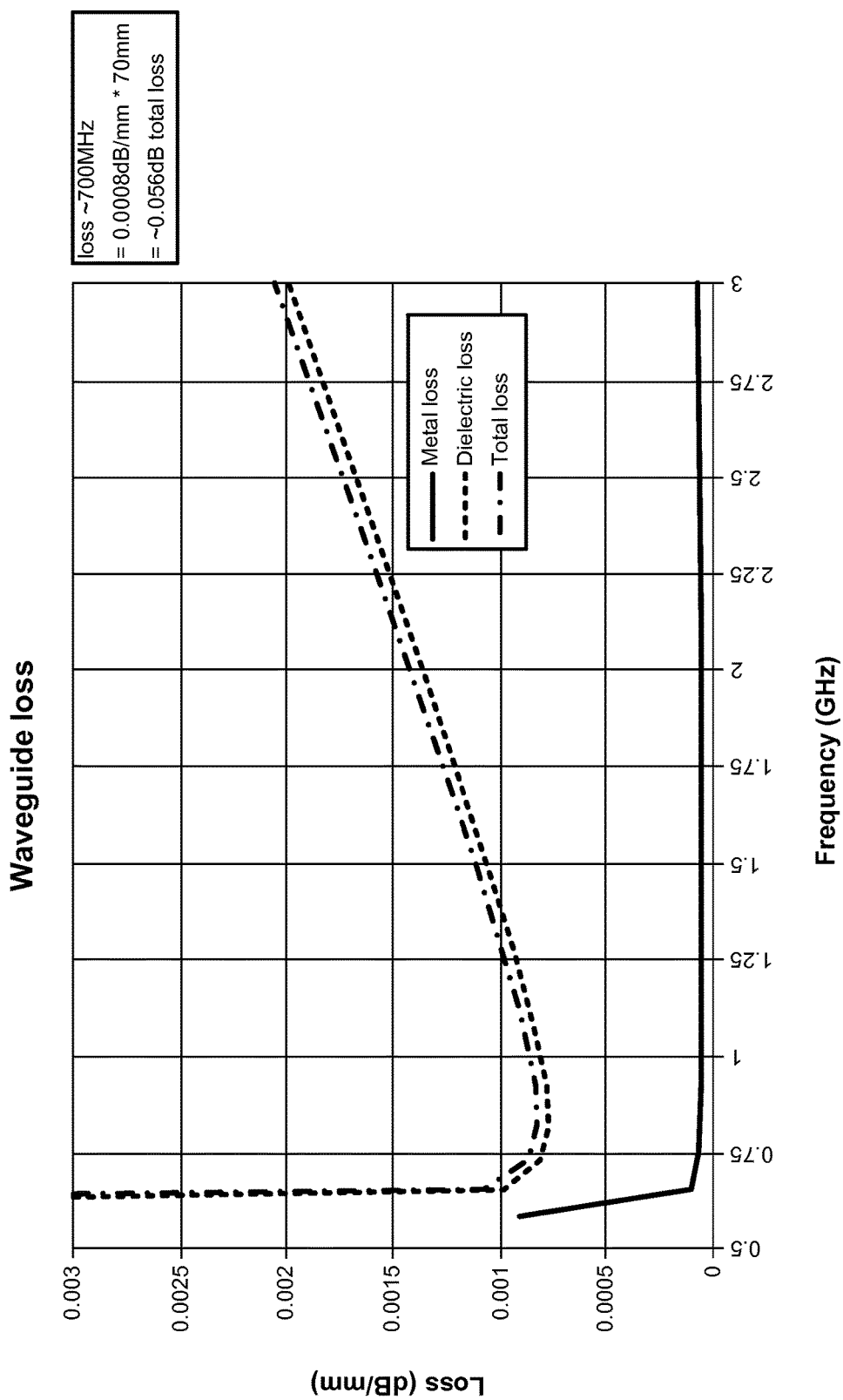
FIG. 7 is a plot of a copper waveguide's loss calculations for the dimension 415a being 20 mm (which is a reasonable thickness of a waveguide that is not constrained in this dimension)
Figure 8:
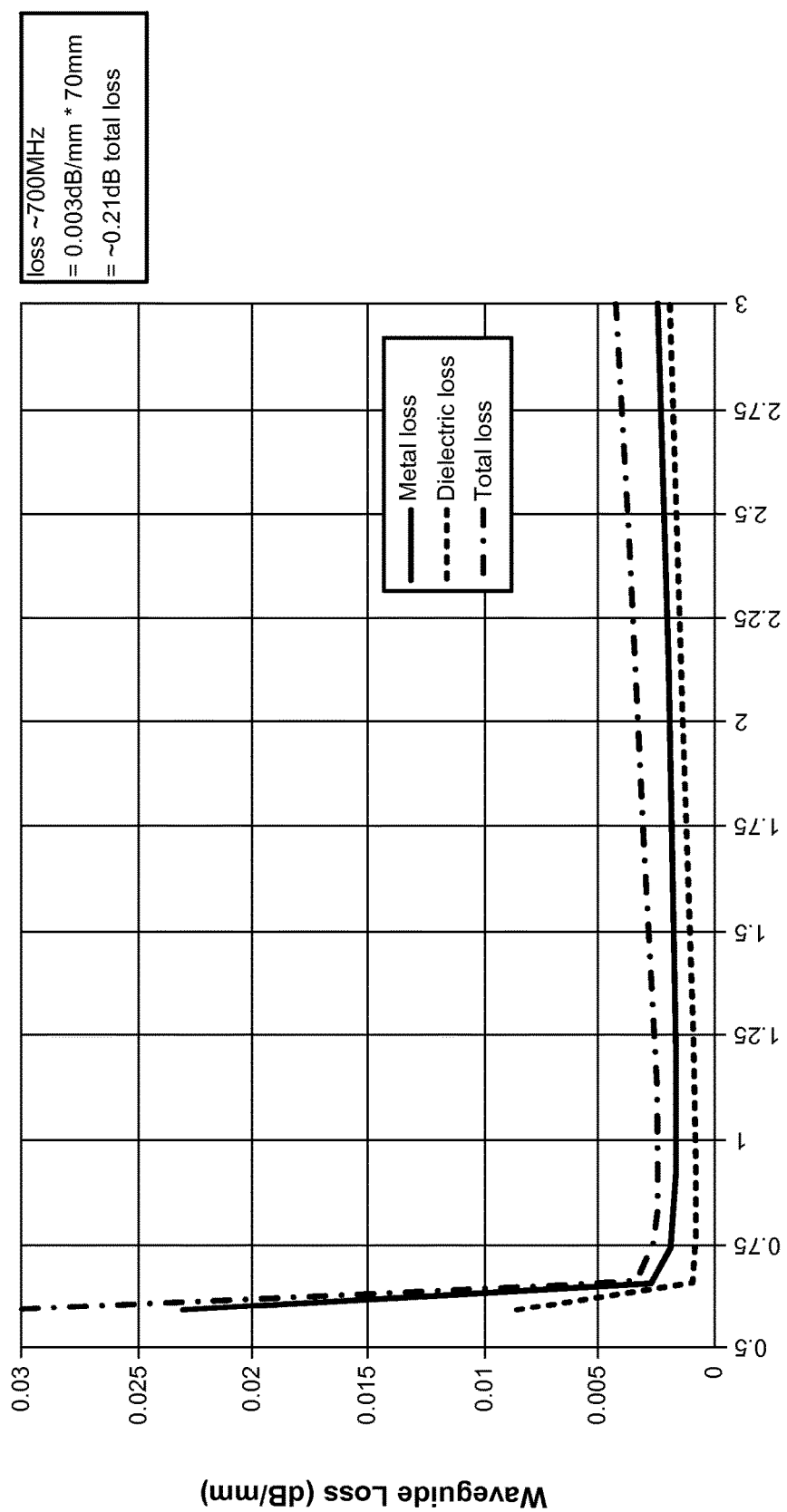
FIG. 8 is a plot of a copper waveguide's loss calculations for the dimension 415a being 0.5 mm (which may be the minimum viable thickness for some embodiments)

FIG. 7 is a plot of a copper waveguide's loss calculations for the dimension 415a being 20 mm (which is a reasonable thickness of a waveguide that is not constrained in this dimension). As indicated the dielectric is primarily responsible for the loss and will increase with frequency. The depicted ranges would be viable for communication in some embodiments. FIG. 8 is a plot of a copper waveguide's loss calculations for the dimension 415a being 0.5 mm (which may be the minimum viable thickness for some embodiments). Here, both the metal and dielectric contribute roughly equally to the loss. As indicated, the total loss is greater for increasing frequencies than the arrangement simulated in FIG. 7. Still, the depicted ranges may also be viable for communication in some embodiments.

Figure 9:
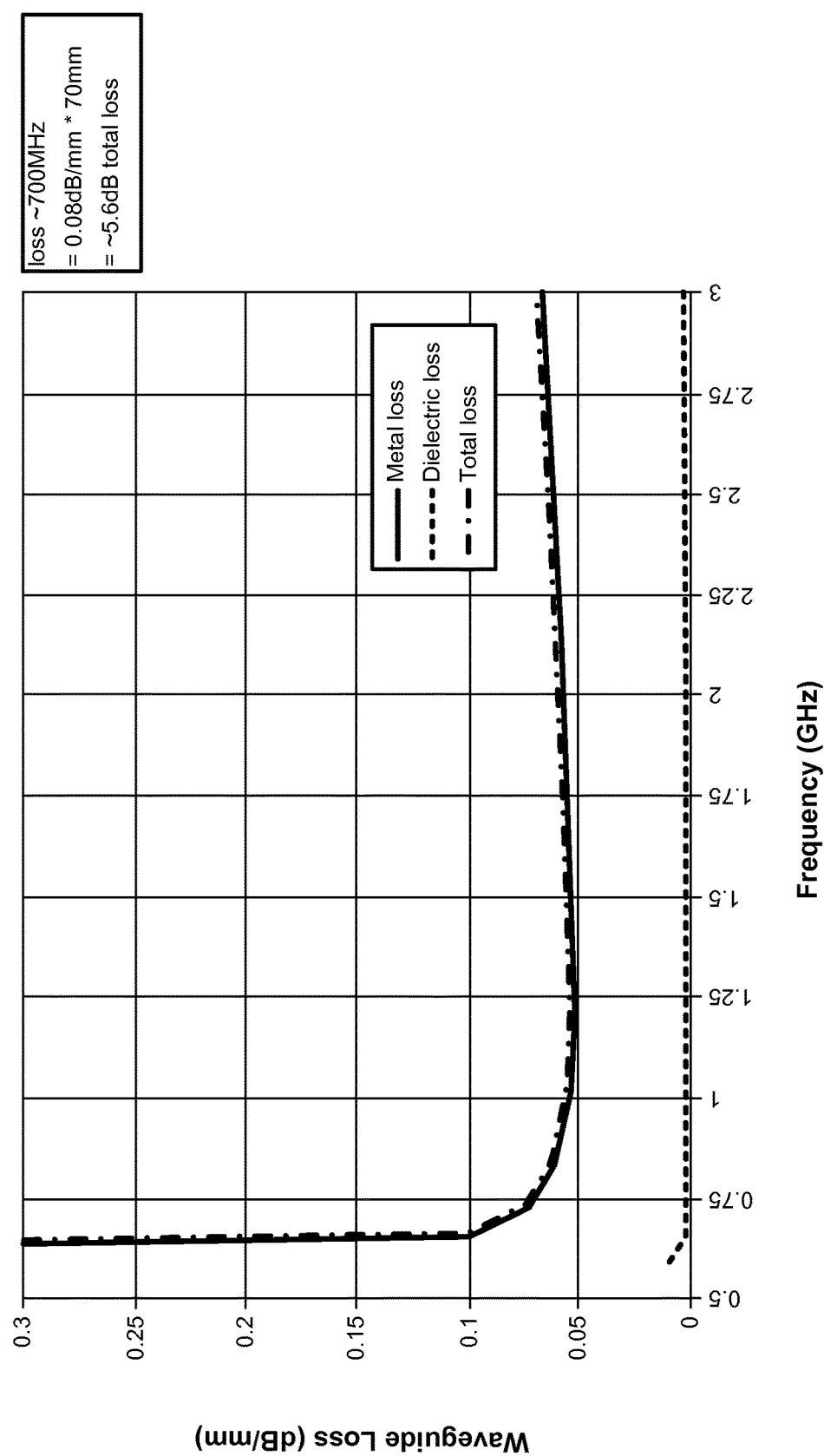
FIG. 9 is a plot of an ITO-like material (e.g., 20 ohm/sq sheet resistance) waveguide's loss calculations for the dimension 415a being 20 mm.
Figure 10:
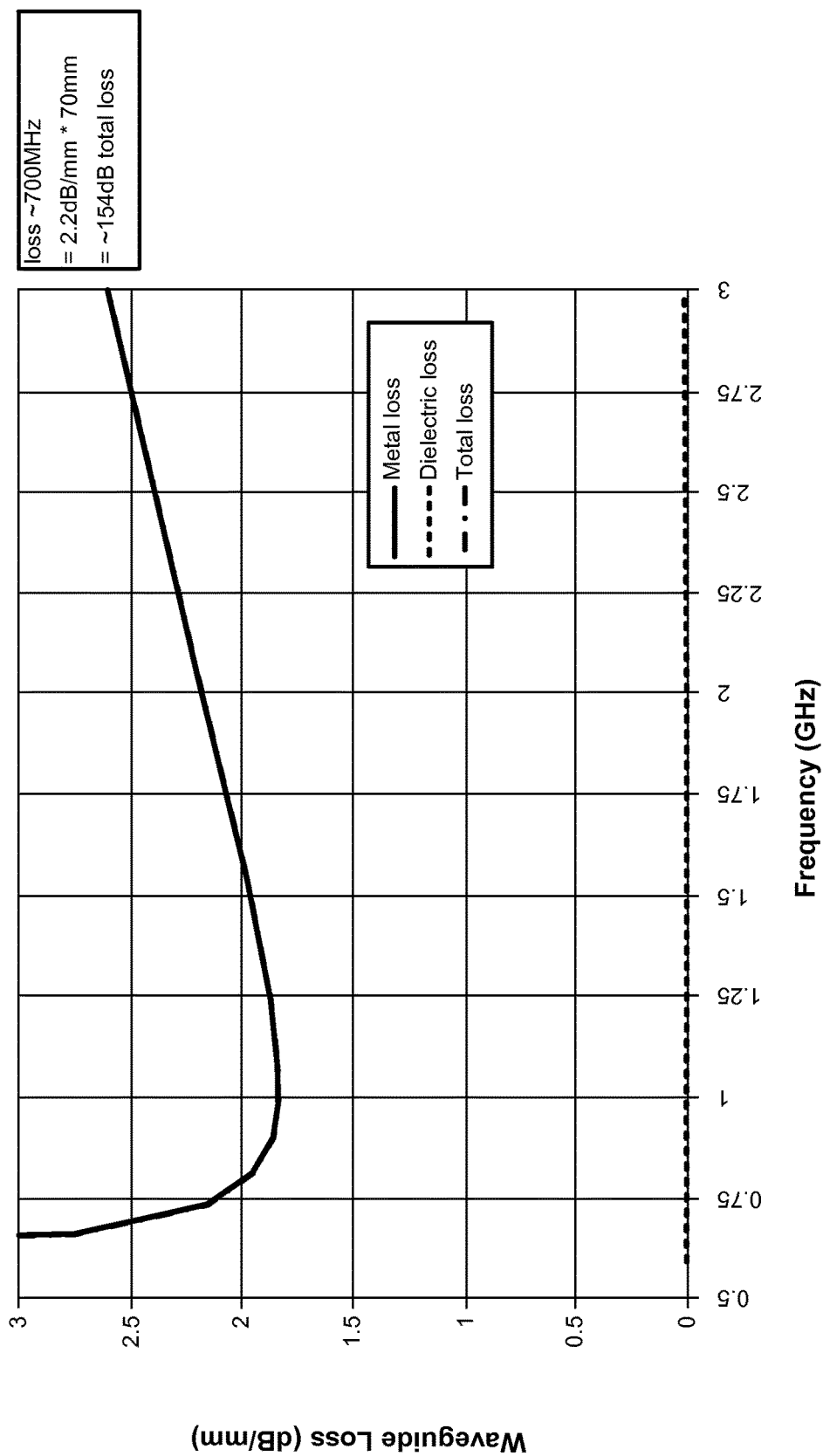
FIG. 10 is a plot of an ITO-like material (e.g., 20 ohm/sq) waveguide's loss calculations for the dimension 415a being 0.5 mm (which may be a viable thickness for some embodiments)

FIG. 9 is a plot of an ITO-like material (e.g., 20 ohm/sq sheet resistance) waveguide's loss calculations for the dimension 415a being 20 mm (which may be the break-even thickness for an ITO-like material). The depicted ranges would be viable for communication in some embodiments. FIG. 10 is a plot of an ITO-like material (e.g., 20 ohm/sq) waveguide's loss calculations for the dimension 415a being 0.5 mm (which may be a viable thickness for some embodiments). Here, the loss is primarily attributed to the metal. In this case, the loss is so great that the material may not be viable for communication as desired. Many off-the-shelf materials include this property, and accordingly, various embodiments select alternative materials and/or structures.

Though FIGS. 9 and 10 consider off-the-shelf materials, some embodiments contemplate materials and structures with decreasing resistivity and a corresponding reduction in the break-even thickness and losses.

Figure 11:
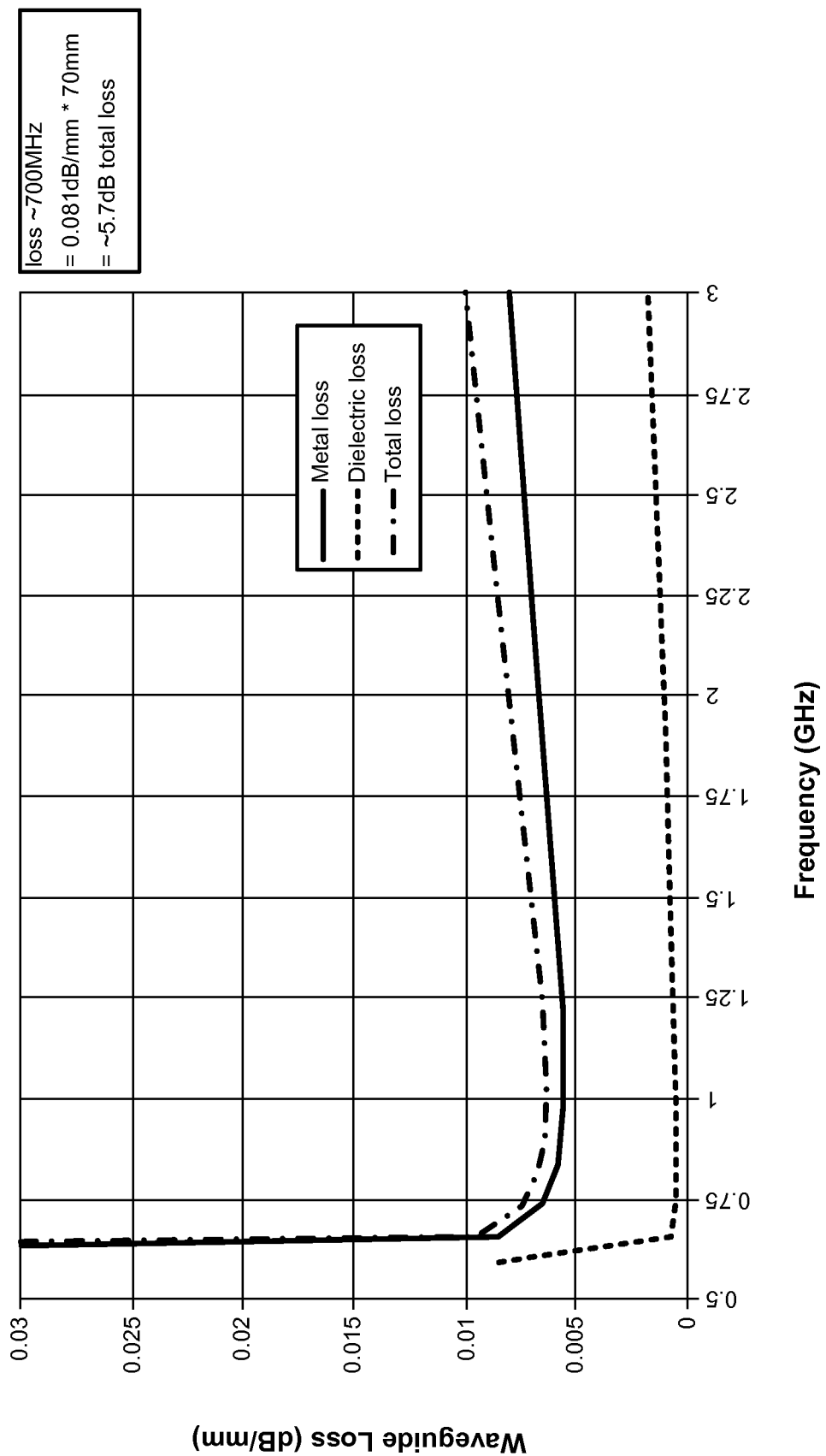
FIG. 11 is a plot of an ITO-like material's waveguide loss calculations (with the assumption that ITO-like materials will achieve a resistance of 0.0125 ohm/sq, for a material that is 0.5 mm thick) as may be implemented in some embodiments.

FIG. 11 is a plot of an ITO-like material's waveguide loss calculations at a break-even resistivity as may be implemented in some embodiments. The depicted example results are for a pair of two 71 mm wide×70 mm long waveguides with a Z-Axis height of 0.5 mm (e.g., in the configuration of FIGS. 4A-C). This example waveguide has a low loss dielectric of 13 and may have a transparent filling volume. Break-even losses (e.g., comparable to other mobiles antennas=~−6 dB) can be achieved with an ITO-like resistivity of 0.0125 ohm/sq in some embodiments. This may be for a single ITO layer that is, e.g., 0.5 mm thick. As indicated, the metal again contributes to the loss more so than the dielectric.

This example may have the benefit of instantaneous bandwidth: 700 MHz-~1300 MHz. Some embodiments may compensate for ITO's lossy character by forming the waveguide(s) into square shapes. These may reduce the total resistance in 2-D lossy structure and maximize the width to length ratio. However, in order to be resonant, some antennas require considerable length. Some square and thin antennas have only 3% fractional bandwidth. Accordingly, various embodiments modify the width/length ratio as desired for a given application (some embodiments may allow the waveguide length/width to be modified dynamically, e.g., using nanomeshes).

Example Horn Structure and Experimental Results

Figure 12B:
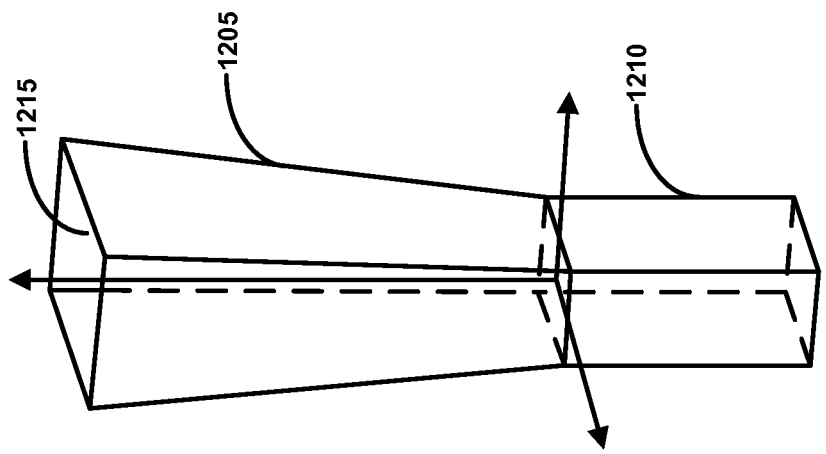
FIG. 12A is a side view and FIG. 12B is a corner view of a horn waveguide as may be implemented in some embodiments.
Figure 12A:
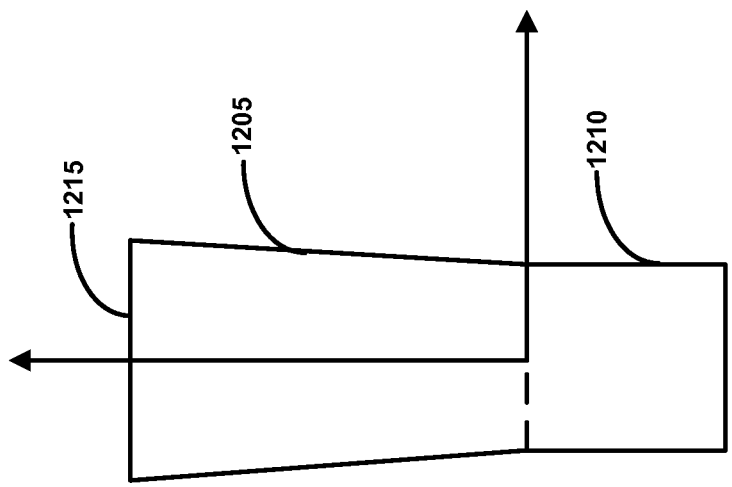

FIG. 12A is a side view and FIG. 12B is a corner view of a horn waveguide as may be implemented in some embodiments. Portions of the waveguide leading to apertures 225a and 225b or apertures 425a, 425a may be flared as indicated by the flared portion 1205 to produce a horn waveguide. Consequently, the dimensions of apertures 225a and 225b or apertures 425a, 425a may correspond to the dimensions of aperture 1215 (one will recognize that the depicted dimensions are not necessarily to scale and may not reflect the relative dimensions of the flared and unflared portions in all embodiments). In some embodiments, both ends of the waveguide may be flared (e.g., each of apertures 225a and 225b), while in some embodiments only one end of the waveguide is flared. The unflared portion 1210 may contain a source emitter in some embodiments.

Figure 13:
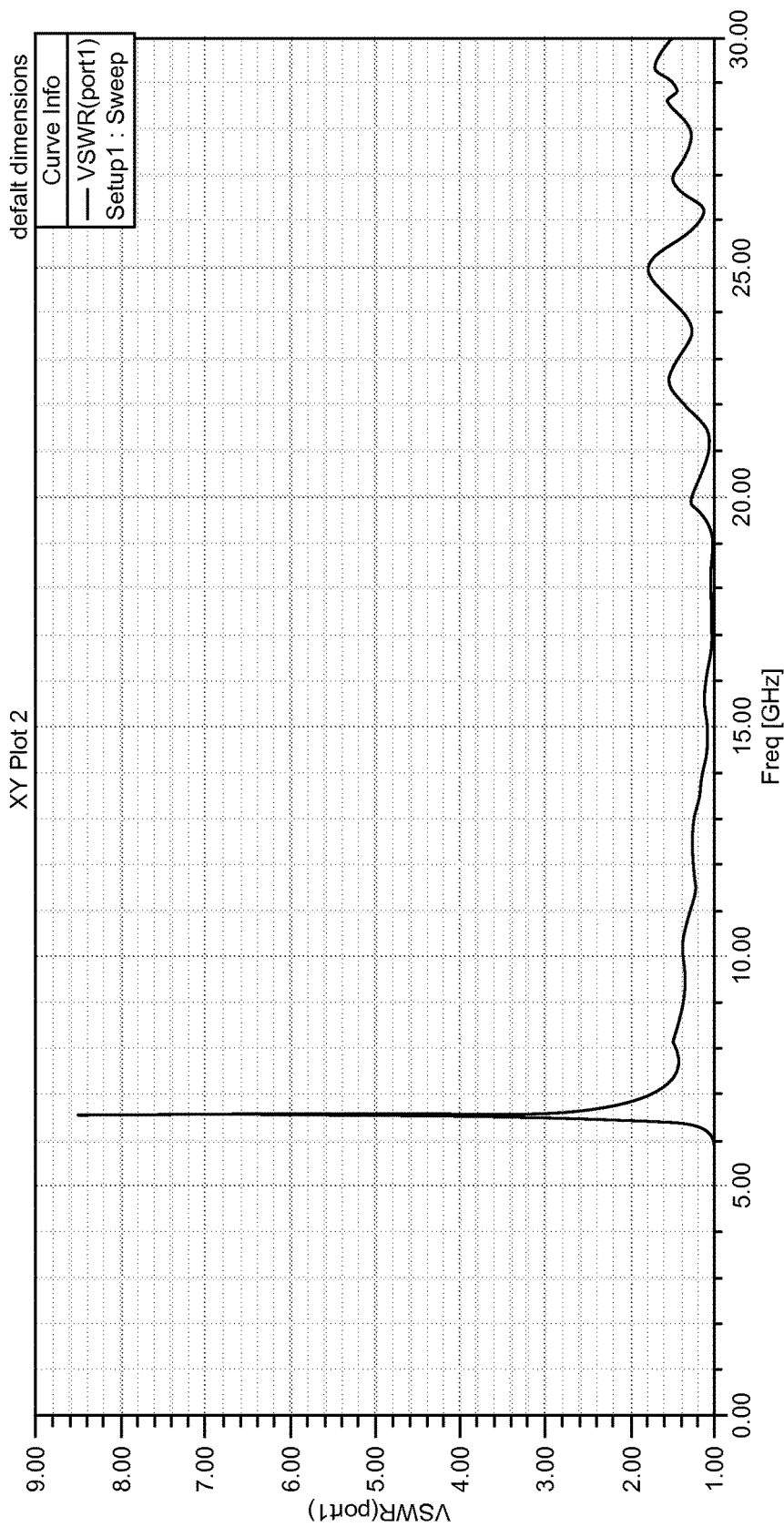
FIG. 13 is a plot of a horn waveguide's Voltage Standing Wave Ratio (VSWR) as a function of frequency as may be implemented in some embodiments.
Figure 14:
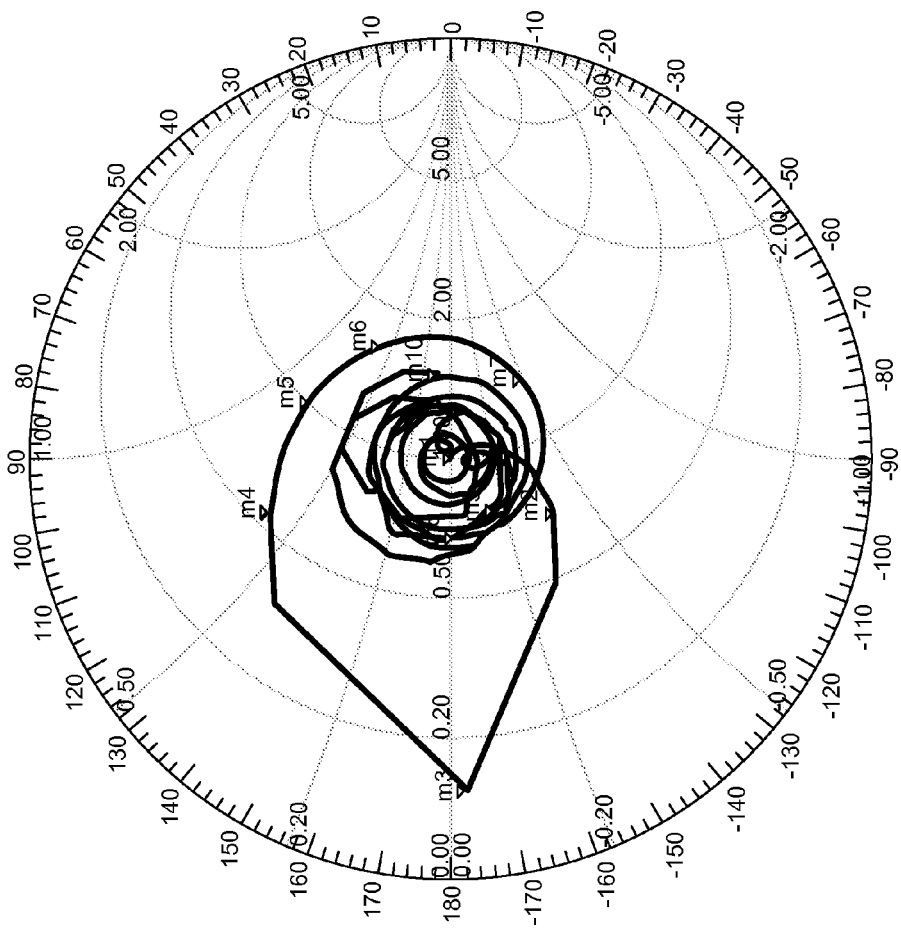
FIG. 14 is a plot of a Smith chart for a horn waveguide as may be implemented in some embodiments.

FIG. 13 is a plot of a horn waveguide's Voltage Standing Wave Ratio (VSWR) as a function of frequency as may be implemented in some embodiments. FIG. 14 is a plot of a Smith chart for a horn waveguide, depicting the impedance of a transmission line as a function of frequency as may occur in some embodiments.

Computer System

Figure 15:
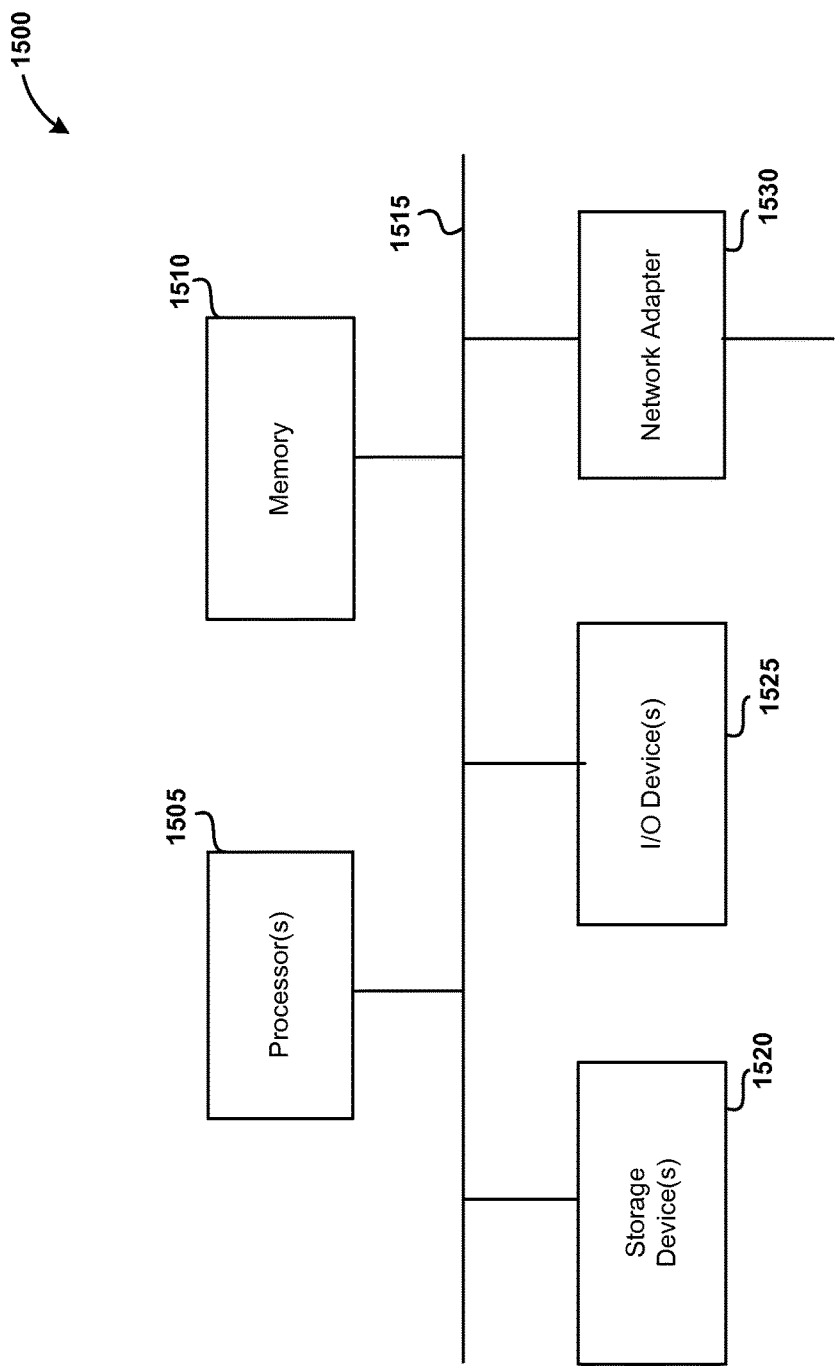
FIG. 15 is a block diagram of a computer system as may be used to implement features of some of the embodiments.

FIG. 15 is a block diagram of a computer system as may be used to implement features of some of the embodiments, e.g., to control the emission sources and generate a desired power distribution via one or more waveguides. The computing system 1500 may include one or more central processing units ("processors") 1505, memory 1510, input/output devices 1525 (e.g., keyboard and pointing devices, display devices), storage devices 1520 (e.g., disk drives), and network adapters 1530 (e.g., network interfaces) that are connected to an interconnect 1515. The interconnect 1515 is illustrated as an abstraction that represents any one or more separate physical buses, point to point connections, or both connected by appropriate bridges, adapters, or controllers. The interconnect 1515, therefore, may include, for example, a system bus, a Peripheral Component Interconnect (PCI)

bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1510 and storage devices 1520 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1510 can be implemented as software and/or firmware to program the processor(s) 1505 to carry out actions described above. In some embodiments, such software or firmware may be initially provided to the processing system 1500 by downloading it from a remote system through the computing system 1500 (e.g., via network adapter 1530).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A communications device, comprising:
   a display having a width and a length, the width less than the length, the width extending in a first direction, the length extending in a second direction, wherein, the display comprises a touch film, the touch film beneath a cover and above a color filter array; and
   a waveguide extending at least the length of the display and more than 90% of the width of the display, wherein the waveguide is beneath the cover and the waveguide is above the touch film,
   the waveguide comprises an emission source configured to emit electromagnetic radiation,
   the waveguide comprises a first aperture parallel to the first direction, and
   the waveguide comprises a second aperture parallel to the first direction.

2. The communications device of claim 1, wherein the waveguide and the cover share at least one surface.

3. The communications device of claim 1, wherein a first edge of the waveguide parallel with the second direction comprises a conductive material and a second edge of the waveguide parallel with the second direction comprises a conductive material.

4. The communications device of claim 1, wherein the waveguide comprises a nanomesh.

5. The communications device of claim 1, wherein the waveguide and the display comprise ITO.

6. The communications device of claim 1, wherein a surface of the waveguide parallel to a plane formed by the first direction and the second direction comprises ITO.

7. The communications device of claim 6, wherein the ITO comprises between 70-90% $IN_2O_3$ and between 30%-10% $SnO_2$ by weight.

8. The communications device of claim 1, wherein a width of the waveguide is between 60-80 mm.

9. The communications device of claim 1, wherein a length of the waveguide is between 120-160 mm.

10. The communications device of claim 1, wherein a height of the waveguide in a third direction orthogonal to a plane formed by the first direction and the second direction is between 0.3 and. 0.7 mm.

11. A communications device, comprising:
a display having a width and a length, the width less than the length, the width extending in a first direction, the length extending in a second direction, wherein, the display comprises a touch film, the touch film beneath a cover and above a color filter array, the color filter array above a thin film transistor; and
a waveguide extending at least the length of the display and more than 90% of the width of the display, wherein the waveguide is beneath the thin film transistor,
the waveguide comprises an emission source configured to emit electromagnetic radiation,
the waveguide comprises a first aperture parallel to the first direction, and
the waveguide comprises a second aperture parallel to the first direction.

12. The communications device of claim 11, wherein the waveguide comprises a nanomesh.

13. The communications device of claim 11, wherein the waveguide comprises ITO.

14. The communications device of claim 13, wherein the ITO comprises between 70-90% $IN_2O_3$ and between 30%-10% $SnO_2$ by weight.

15. The communications device of claim 11, wherein the emission source is substantially equidistant from a first edge of the waveguide parallel with the second direction and a second edge of the waveguide parallel with the second direction.

16. The communications device of claim 11, wherein a width of the waveguide in the first direction is substantially half a wavelength of a lowest frequency that the communications device is configured to communicate using the waveguide.

* * * * *